United States Patent
Wilson et al.

(10) Patent No.: US 11,240,359 B2
(45) Date of Patent: Feb. 1, 2022

(54) AUXILIARY GRIP SYSTEM

(71) Applicant: Jeffrey Overall, Costa Mesa, CA (US)

(72) Inventors: Tyler Wilson, Ponca City, OK (US); Esteban Martinez, Costa Mesa, CA (US)

(73) Assignee: Polar Pro Filters, Inc., Costa Mesa, CA (US)

(*) Notice: Subject to any disclaimer, the term of this patent is extended or adjusted under 35 U.S.C. 154(b) by 295 days.

(21) Appl. No.: 16/673,776

(22) Filed: Nov. 4, 2019

(65) Prior Publication Data

US 2020/0076936 A1    Mar. 5, 2020

(51) Int. Cl.
*H04M 1/04* (2006.01)
*H04M 1/02* (2006.01)
*A45F 5/00* (2006.01)
*A45C 11/00* (2006.01)

(52) U.S. Cl.
CPC .............. *H04M 1/04* (2013.01); *A45C 11/00* (2013.01); *A45F 5/00* (2013.01); *H04M 1/0279* (2013.01); *A45C 2011/002* (2013.01); *A45F 2200/0516* (2013.01)

(58) Field of Classification Search
CPC ..... H04M 1/04; A45F 2200/0516; A45F 5/00; A45F 3/047; A45C 11/00; B60R 2011/0071; B60R 11/0241
USPC .................... 224/570, 197; 248/316.1–316.6; 379/455
See application file for complete search history.

(56) References Cited

U.S. PATENT DOCUMENTS

| | | | | |
|---|---|---|---|---|
| 2,283,988 A | * | 5/1942 | Heath | A47K 5/05 401/6 |
| 3,666,901 A | * | 5/1972 | Weinhart | H01H 3/20 200/43.18 |
| 4,247,230 A | | 1/1981 | Forster | |
| 4,299,344 A | * | 11/1981 | Yamashita | A45F 5/00 224/242 |
| 4,325,142 A | * | 4/1982 | Nakazawa | H04B 1/385 455/346 |
| 4,887,753 A | * | 12/1989 | Allen | B60R 11/02 224/312 |
| 5,121,863 A | * | 6/1992 | Kotitalo | B60R 11/0241 224/570 |
| 5,193,966 A | | 3/1993 | Jung | |
| 5,457,745 A | * | 10/1995 | Wang | B60R 11/0241 379/426 |
| 5,555,302 A | * | 9/1996 | Wang | B60R 11/0241 379/426 |
| 5,632,385 A | | 5/1997 | Mantey | |
| 5,694,468 A | * | 12/1997 | Hsu | B60R 11/0241 379/426 |
| 5,755,367 A | * | 5/1998 | Yamada | H04B 1/086 224/245 |
| 5,762,605 A | | 6/1998 | Cane | |
| 5,788,202 A | * | 8/1998 | Richter | B60R 11/0241 248/316.4 |
| 5,836,563 A | * | 11/1998 | Hsin-Yung | H04M 1/11 248/316.4 |

(Continued)

*Primary Examiner* — Justin M Larson (57) ABSTRACT

A protective phone case system enabling quick release coupling of an auxiliary grip with a phone case. Two arms enable couple of the auxiliary grip with a phone case. A push button is configured to interact with the arms to couple and detach from the phone case. Two rails may enable coupling of the auxiliary grip within an adjustment range.

12 Claims, 12 Drawing Sheets

(56) References Cited

U.S. PATENT DOCUMENTS

| | | | | |
|---|---|---|---|---|
| 5,903,645 A * | 5/1999 | Tsay | ................... | B60R 11/0241 |
| | | | | 379/455 |
| 5,947,359 A * | 9/1999 | Yoshie | ............... | B60R 11/0241 |
| | | | | 224/570 |
| 6,006,969 A * | 12/1999 | Kim | ....................... | A45F 5/021 |
| | | | | 224/197 |
| 6,009,338 A * | 12/1999 | Iwata | ..................... | H04M 1/56 |
| | | | | 455/575.4 |
| 6,217,095 B1 | 4/2001 | Yamada | | |
| 6,709,034 B2 | 3/2004 | Michael | | |
| 6,739,682 B2 | 5/2004 | Shih | | |
| 6,742,215 B2 | 6/2004 | Panfili | | |
| 6,923,485 B1 | 8/2005 | Bauswell | | |
| 7,272,984 B2 * | 9/2007 | Fan | ........................ | B60R 11/02 |
| | | | | 248/231.61 |
| 7,407,143 B1 * | 8/2008 | Chen | .................. | B60R 11/0241 |
| | | | | 248/309.1 |
| 7,537,190 B2 * | 5/2009 | Fan | ........................ | B60R 11/02 |
| | | | | 248/309.1 |
| 7,712,720 B1 * | 5/2010 | Cheng | .................... | B60R 11/00 |
| | | | | 248/346.07 |
| 8,146,996 B2 | 4/2012 | Vedder | | |
| 8,328,359 B2 | 12/2012 | Monroe | | |
| 8,380,264 B2 | 2/2013 | Hung | | |
| 8,567,737 B2 * | 10/2013 | Chen | ................... | H04B 1/3877 |
| | | | | 248/316.2 |
| 8,622,447 B1 * | 1/2014 | Wirtz | .................... | F16M 13/00 |
| | | | | 294/25 |
| 8,752,321 B2 | 6/2014 | Burress | | |
| 8,777,173 B2 * | 7/2014 | Nemoto | ............... | F16M 11/041 |
| | | | | 248/316.4 |
| 8,973,795 B2 | 3/2015 | Chiu | | |
| 9,031,623 B2 | 5/2015 | Yoo | | |
| 9,033,384 B2 | 5/2015 | Potter | | |
| 9,179,762 B2 | 11/2015 | Paugh | | |
| 9,226,567 B2 | 1/2016 | Potter | | |
| 9,407,743 B1 | 8/2016 | Hirshberg | | |
| 9,654,167 B1 | 5/2017 | White | | |
| 9,749,002 B1 * | 8/2017 | Fan | ....................... | H04B 1/3888 |
| 10,080,408 B1 | 9/2018 | Wood | | |
| 10,118,287 B2 | 11/2018 | Billups | | |
| 10,201,221 B1 | 2/2019 | Chang | | |
| 10,648,493 B1 * | 5/2020 | Liao | ....................... | F16H 19/04 |
| 10,663,104 B2 * | 5/2020 | Yang | ..................... | F16M 13/022 |
| 10,764,417 B1 * | 9/2020 | Malach | .................. | H04M 1/04 |
| 10,782,596 B2 * | 9/2020 | Wilson | .................. | F16M 13/02 |
| 10,882,463 B2 * | 1/2021 | Yang | ..................... | H04M 1/04 |
| 11,027,665 B1 * | 6/2021 | Cao | ..................... | B60R 11/0241 |
| 2002/0158096 A1 * | 10/2002 | Wang | .................. | H04B 1/3888 |
| | | | | 224/271 |
| 2004/0179678 A1 * | 9/2004 | Hsu Li | ............... | B60R 11/0247 |
| | | | | 379/441 |
| 2006/0131468 A1 * | 6/2006 | Roncarelli | ................ | A45F 5/00 |
| | | | | 248/300 |
| 2006/0278788 A1 * | 12/2006 | Fan | ....................... | F16M 13/02 |
| | | | | 248/309.1 |
| 2007/0262223 A1 * | 11/2007 | Wang | ..................... | F16M 13/00 |
| | | | | 248/346.07 |
| 2009/0294617 A1 * | 12/2009 | Stacey | ................ | H04B 1/3877 |
| | | | | 248/316.1 |
| 2014/0138419 A1 * | 5/2014 | Minn | ....................... | F16B 2/065 |
| | | | | 224/567 |
| 2014/0228082 A1 * | 8/2014 | Morrow | .................... | A45F 5/00 |
| | | | | 455/575.8 |
| 2015/0129724 A1 * | 5/2015 | Kohmoto | ............... | F16M 13/00 |
| | | | | 248/52 |
| 2017/0231374 A1 * | 8/2017 | Laydera-Collins | ....... | A45F 5/00 |
| | | | | 24/3.4 |
| 2019/0104830 A1 * | 4/2019 | Cortellacci | ................ | A45F 5/00 |
| 2020/0076936 A1 * | 3/2020 | Wilson | .................... | H04M 1/04 |
| 2021/0140580 A1 * | 5/2021 | Nahum | ................ | F16M 11/041 |

\* cited by examiner

AUXILIARY GRIP SYSTEM

FIELD OF INVENTION

The present invention relates to smartphone photography. More specifically, a quick release grip for a protective phone case.

BACKGROUND

Smartphones and other portable mobile devices are widely used to record video footage, take photographs, and capture other types of content. Advanced cameras and lens systems have been integrated with smartphones as a result of digital convergence. Once considered a low-quality photography and videography option, smartphone cameras are now capable of high resolution, varied focal length, and other functions enabling high-quality photography and videography.

At the same time, smartphone dimensions have become uniformly prismatic and flat. Such shape is not conducive to manually orienting a device in the multiple positions needed to capture stable photographic and video content.

Cases developed to protect smartphones are generally configured to contour the dimensions of the phone. Such cases do not improve the ergonomics of camera phone use.

Straps, handles and other auxiliary implements have been developed to improve the ability to hold a phone in a phone case. Straps and handles may offer greater security when holding a phone, while handles may allow a user to hold the phone at different angles or extend it from the body.

The present invention is an auxiliary grip implement enabling improved ergonomics for smartphone photography and videography. A push button quick release system allows fast, easy attachment to a protective phone case.

SUMMARY

An auxiliary grip may couple with a case. The auxiliary grip may comprise a push button. The push button may be partially exposed from a housing. Grip and bumper aspects may comprise the housing. Two arms may provide the fundamental coupling aspects of the auxiliary grip. Ends may comprise the terminal aspects of the arms and enable coupling with a case. The ends may define a grip width.

The push button and arms may be configured within the housing to interact. The push may be capable of a first position and a second position. The first position and second position may define limits of the push button's movement range relative to the housing. The arms may be capable of a locked position and an adjustment position. The locked position may be a position or range of positions in which the auxiliary grip is capable of coupling with a case. The adjustment position may be any grip width in which the auxiliary grip cannot couple with the case.

A case may be configured to couple a device. The case may have a rail width corresponding to the grip width of the locked position of the auxiliary grip. Two rails may be positioned on the perimeter of the case. When the auxiliary grip is in the locked position, the ends, or another aspect of the two arms, may be able to couple with the two rails. The two rails may define an adjustment range, within which the auxiliary grip may couple with the case. The auxiliary grip may operatively couple with the rails when in the adjustment position. Operative coupling may mean the auxiliary grip couples with the two rails, but is capable of adjustment within the adjustment range. The auxiliary grip may detach from the case when in the adjustment position.

Steps may define slots in the rails. The slots may define predetermined grip orientations. When the auxiliary grip couples with the case within a slot, the auxiliary grip steps defining the slot may prevent movement of the auxiliary grip within the adjustment range. In such an embodiment, operative coupling of the auxiliary grip with the two rails may not be possible. To change the grip orientation, the arms may have to be in the adjustment position, whereby the auxiliary grip is detached from the case and moved to a different grip orientation.

DRAWING NUMERALS 10 auxiliary grip
12 case
14 bumper
16 gripping surface
20 push-button
22 internal button
24 button biasing component
30 switch
32 switch spring
34 switch screw
36 switch stop
37 secured position
38 unsecured position
40 end
50 arm
52 arm biasing component
54 buttress
56 cap
60 locked position 62 adjustment position
64 first position
66 second position
70 ancillary coupling means
80 rail
81 step
82 aperture
83 slots
84 rail width
86 case length
88 adjustment range
94 grip width
100 mobile device

DETAILED DESCRIPTION OF THE EMBODIMENT

An auxiliary grip 10 may comprise a push button 20 configured to interact with two arms 50. Two ends 40 may comprise the outer aspects of the two arms 50. A bumper 14 may be disposed between the two ends 40 and comprise an outer surface and housing aspect of the auxiliary grip 10. A gripping surface 16 may couple with the bumper 14 to form a housing. The push button 20 may be partially exposed from the gripping surface 16. A push-button 20 may be any component capable of being pressed, switched, or otherwise manually engaged. An internal push-button 22 aspect of the push button 20 may extend into the housing from an exposed, outer surface of the push button 20 (see FIGS. 2A-B). The internal push button 22 may contact the two arms 50. The arms 50 may extend laterally (relative to the push button 20) towards the ends 40. A cap 56 may couple the arm 52 and end 40. The ends 40 may define an alterable grip width 94.

Figure 1:
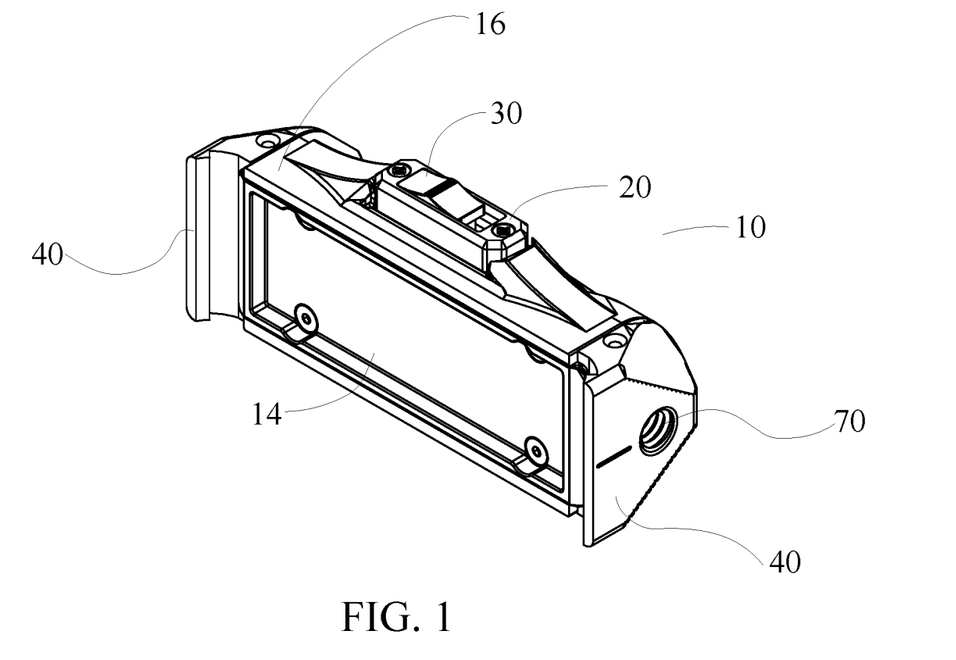
FIG. 1 is a front and top and right perspective view of an auxiliary grip.
Figure 2A:
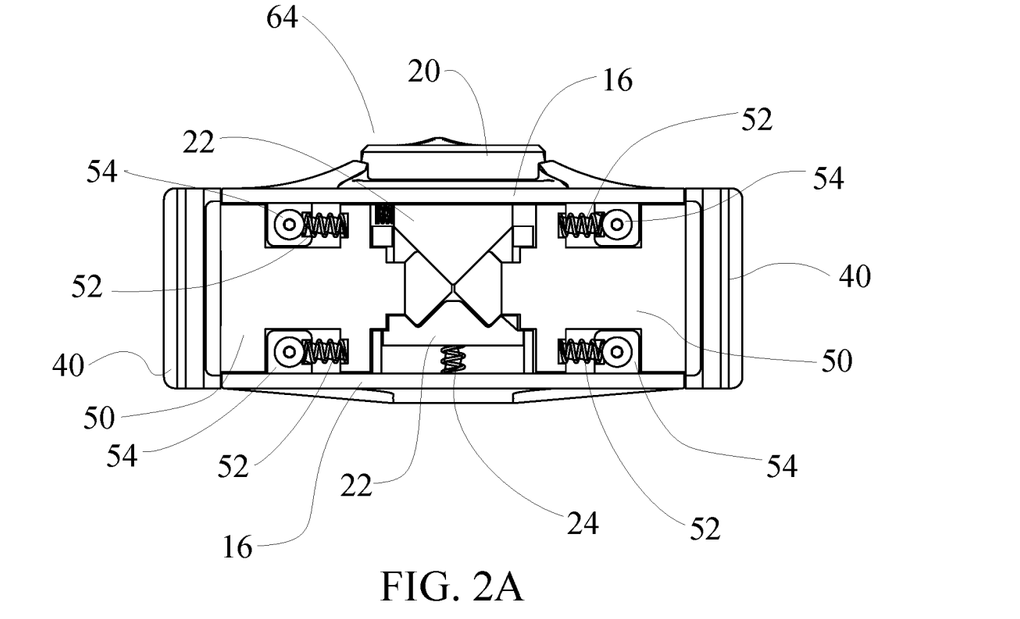
FIG. 2A is a front view of an auxiliary grip in a first position with a bumper removed.
Figure 2B:
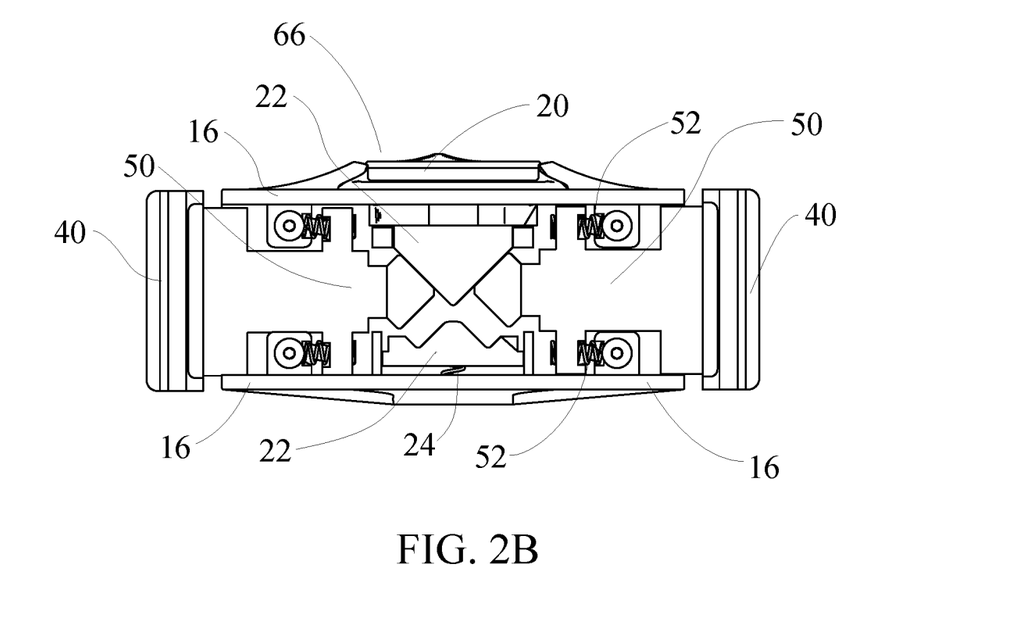
FIG. 2B is a front view of the auxiliary grip in a second position with a bumper removed.
Figure 3:
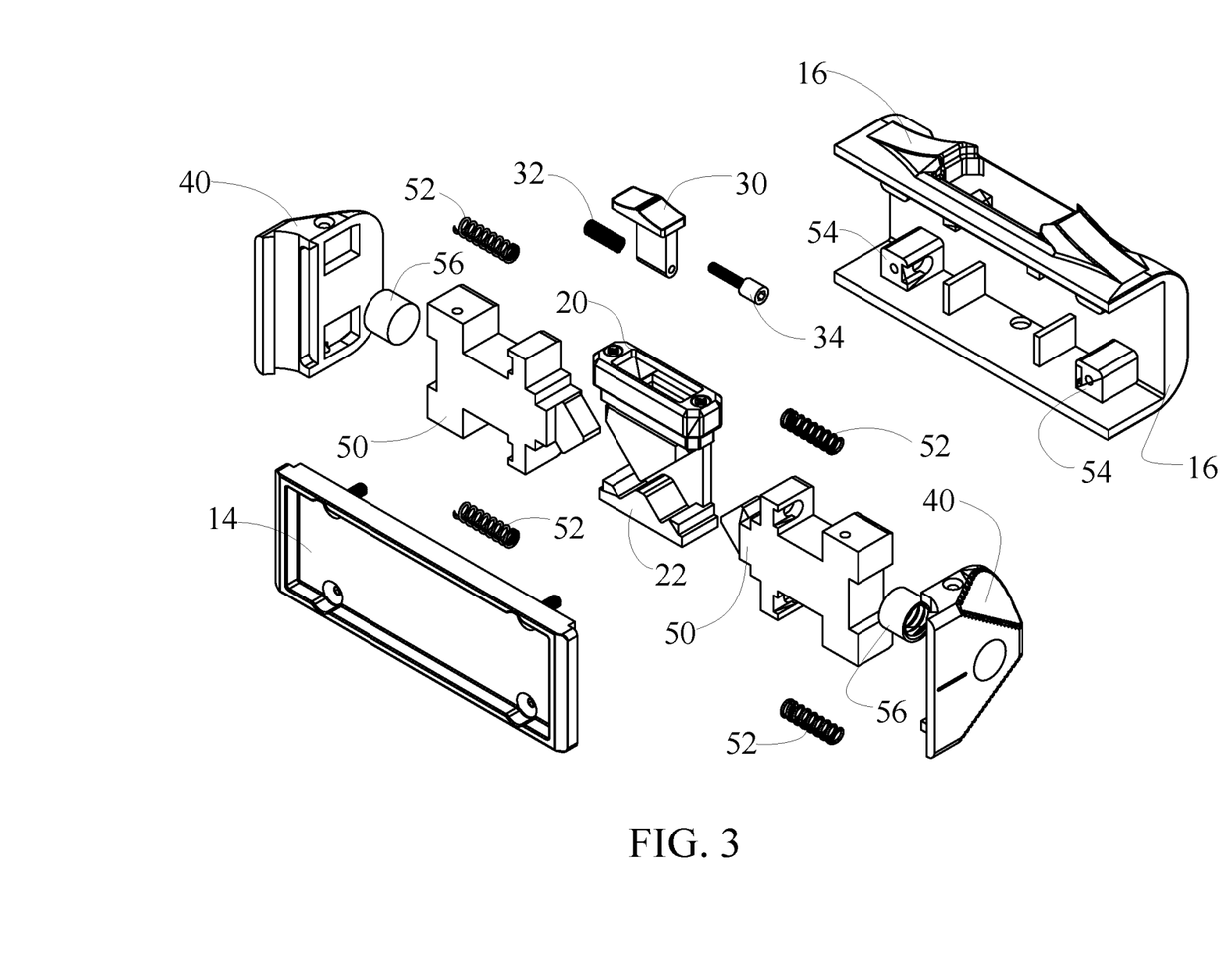
FIG. 3 is a front and top and right perspective view of an auxiliary grip exploded.
Figure 4A:
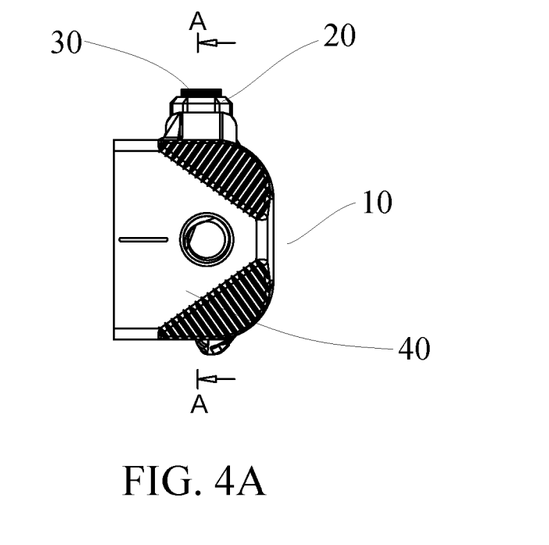
FIG. 4A is a right side view of an auxiliary grip in a first position.
Figure 4B:
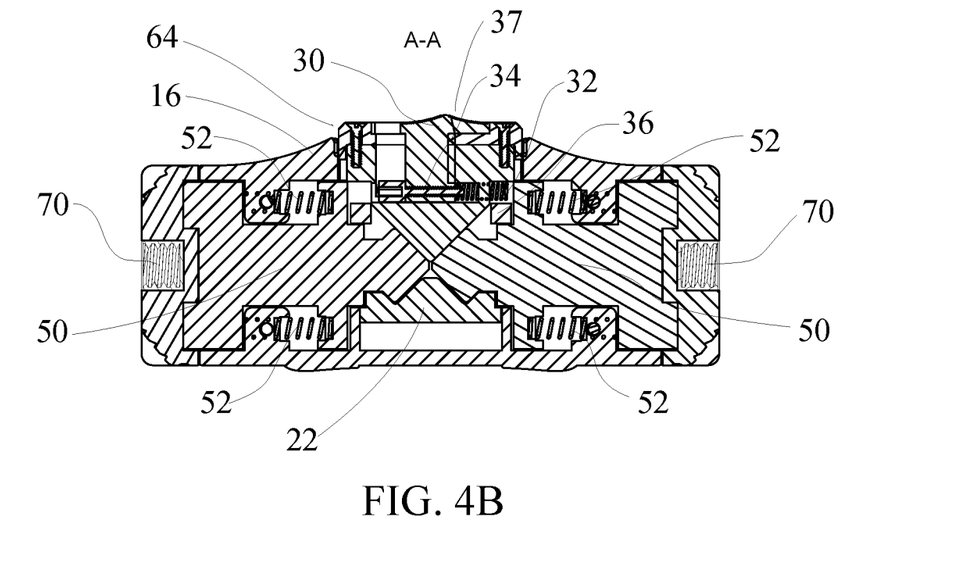
FIG. 4B is the sectional view from FIG. 4A wherein a switch is in a secured position
Figure 4C:
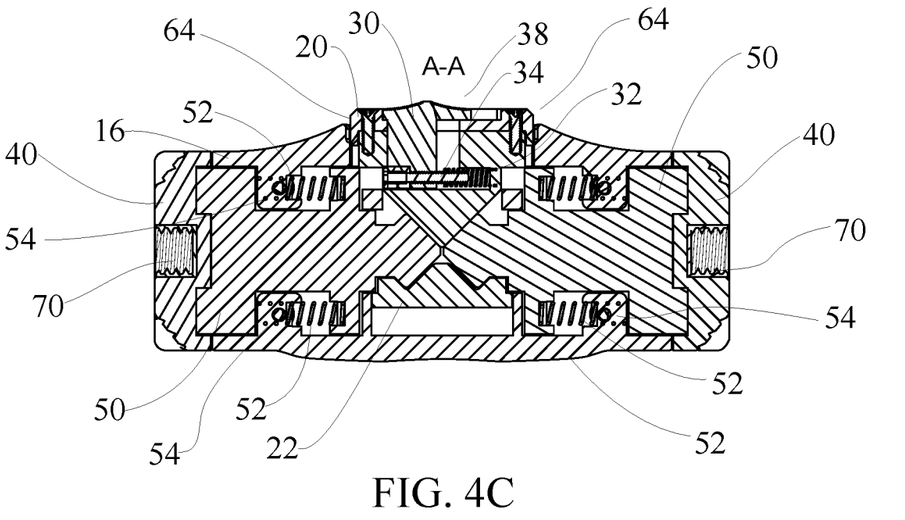
FIG. 4C is the sectional view from FIG. 4A wherein a switch is in an unsecured position.
Figure 4D:
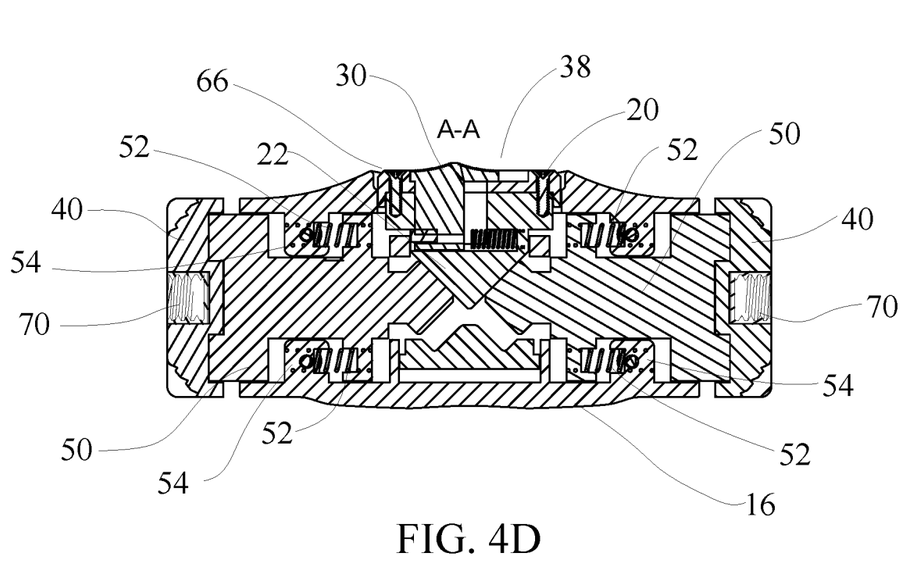
FIG. 4D section of a switch in unsecured position and a push button is in a second position.
Figure 5:
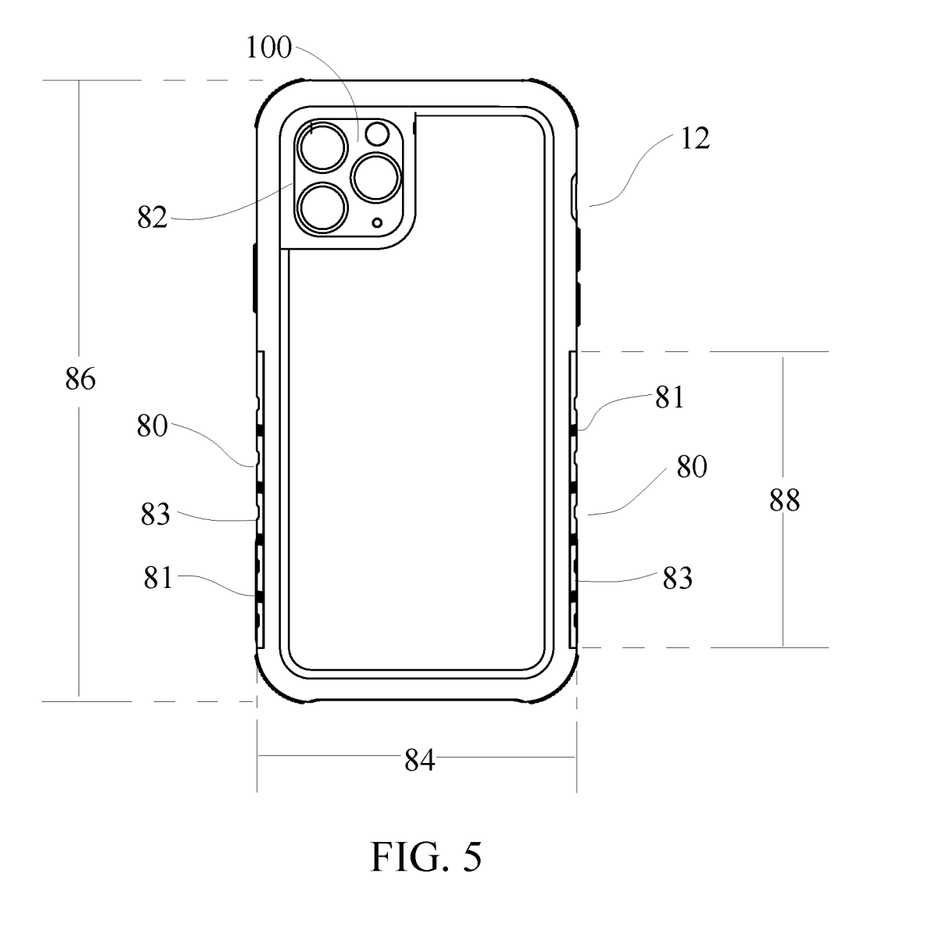
FIG. 5 is a back view of case isolated.
Figure 6:
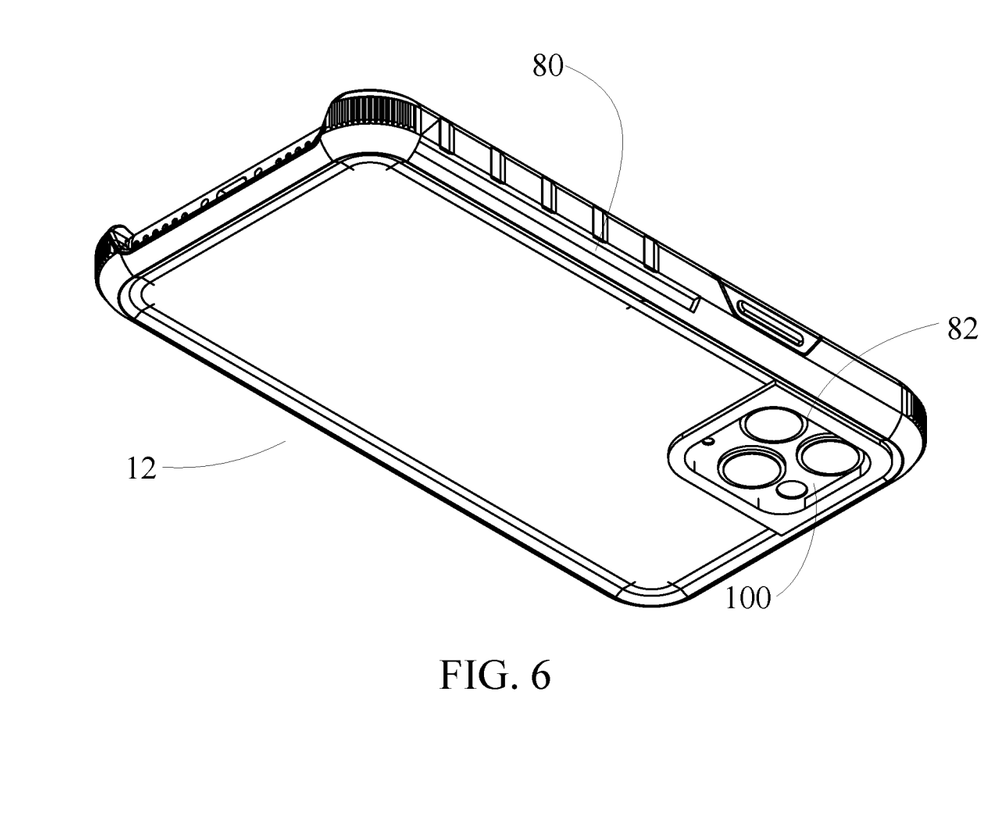
FIG. 6 is a back right perspective of case isolated.
Figure 7A:
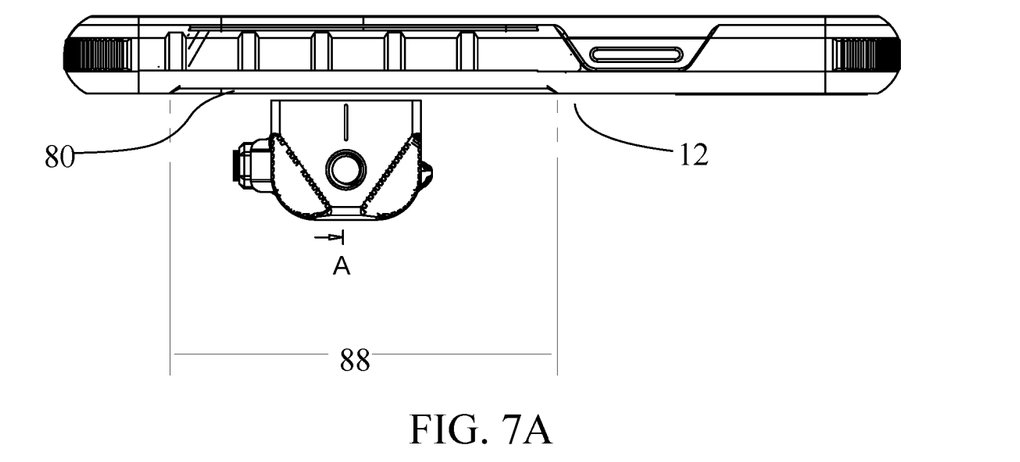
FIG. 7A is a right side view of an isolated case.
Figure 7B:
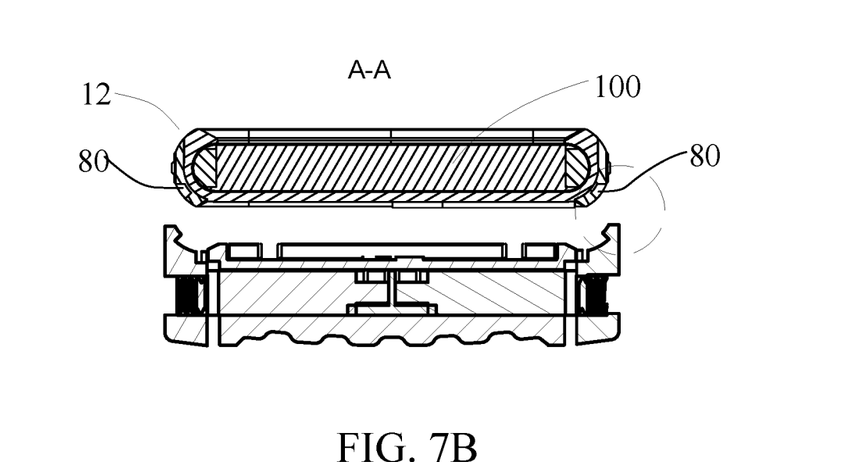
FIG. 7B sectional view of the case from FIG. 7A.
Figure 7C:
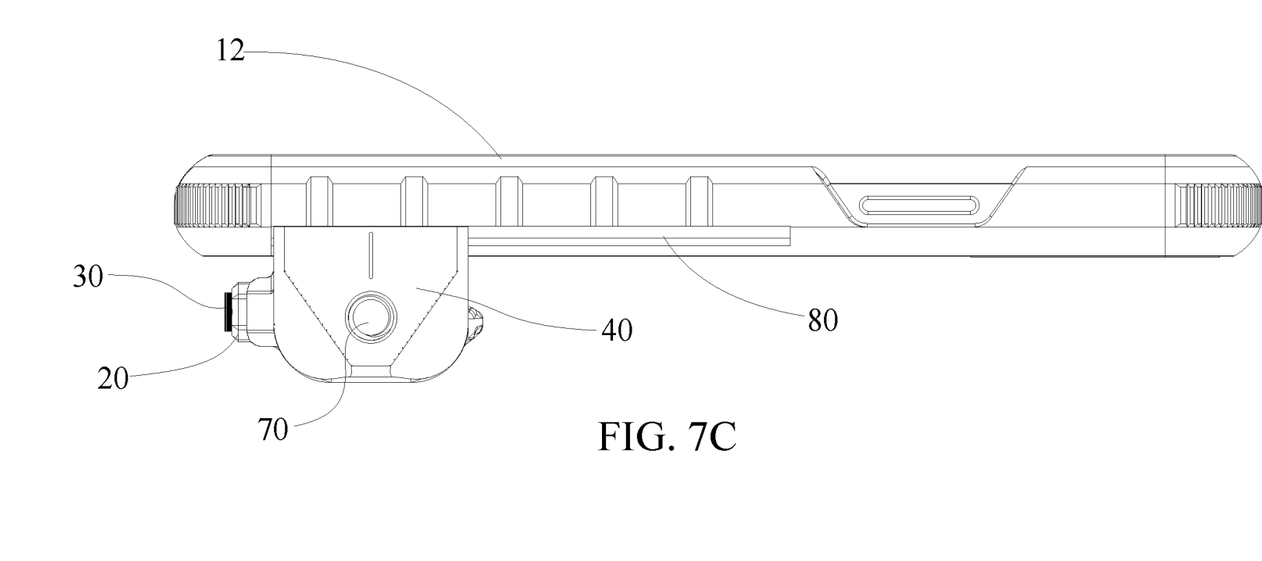
FIG. 7C is a right side view of an auxiliary grip and a case coupled.
Figure 8:
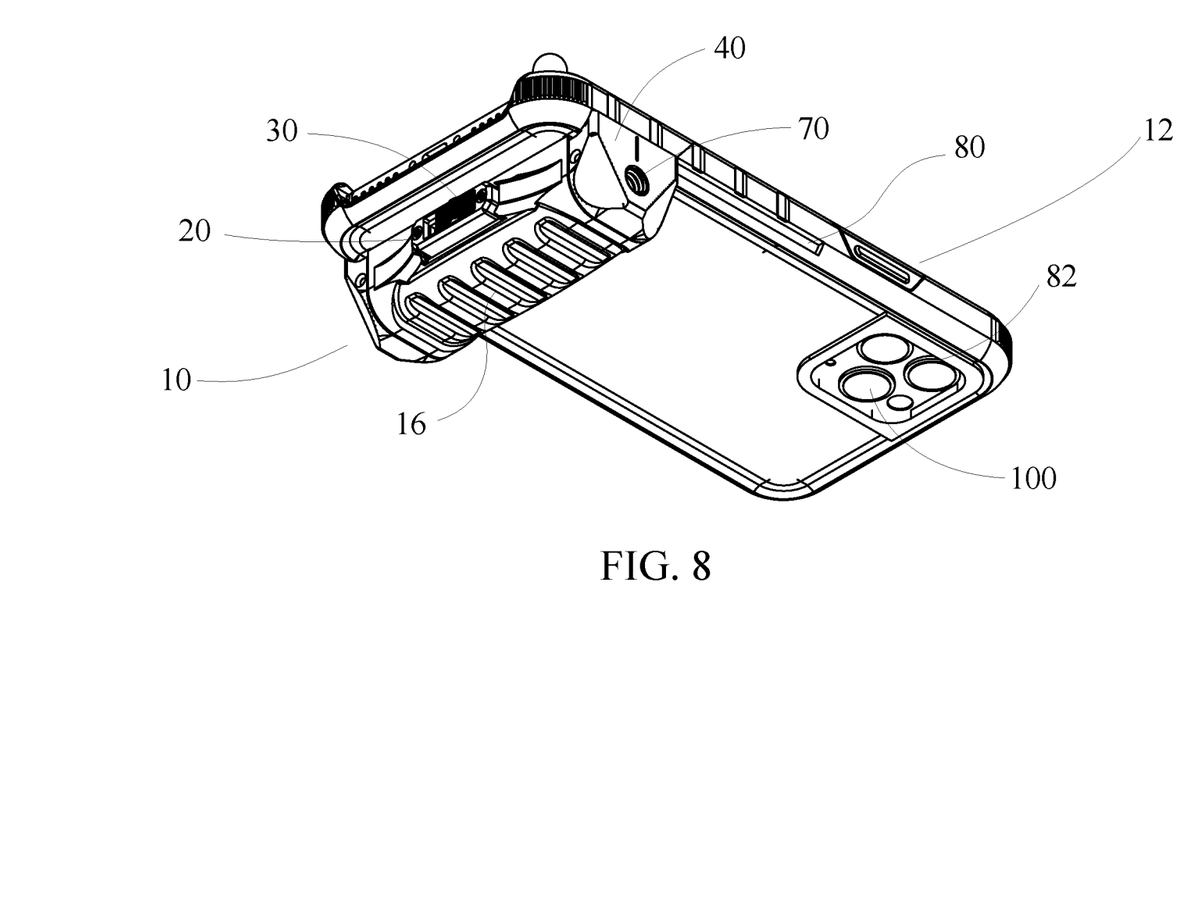
FIG. 8 is a back right perspective view of an auxiliary grip and a case coupled.
Figure 9A:
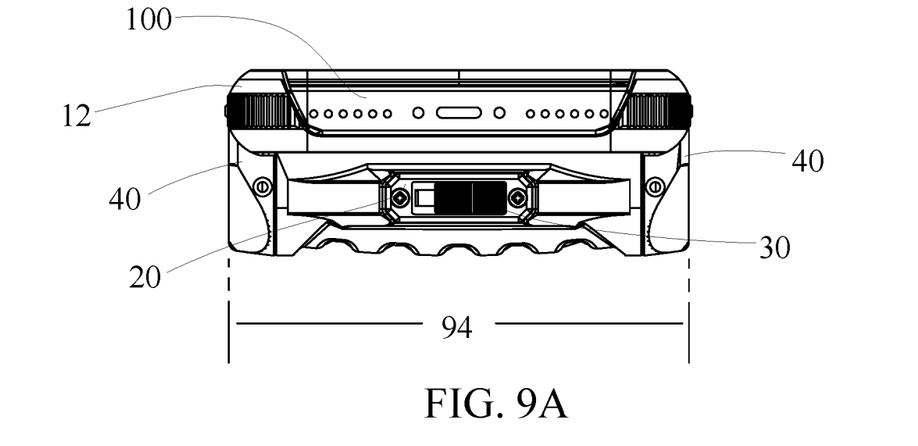
FIG. 9A is a bottom view of an auxiliary grip in a locked position, coupled with a case.
Figure 9B:
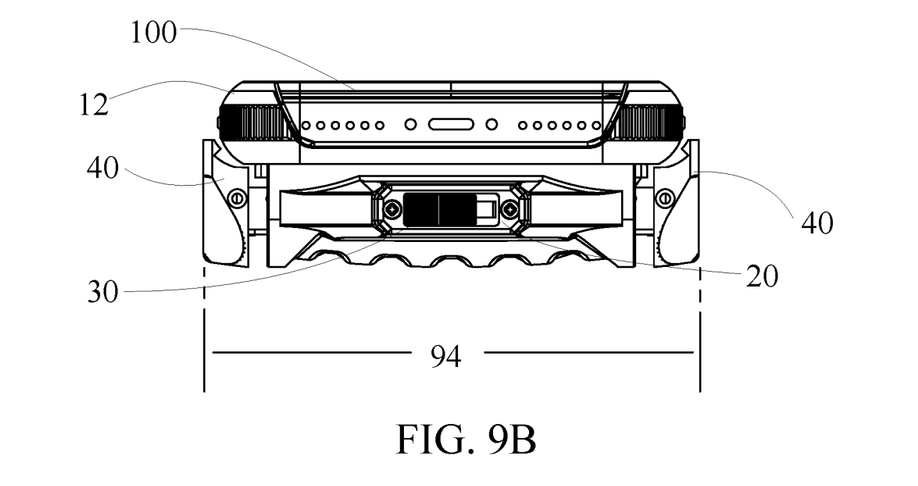
FIG. 9B is a bottom view of an auxiliary grip in an adjustment position, detached from a case.
Figure 10:
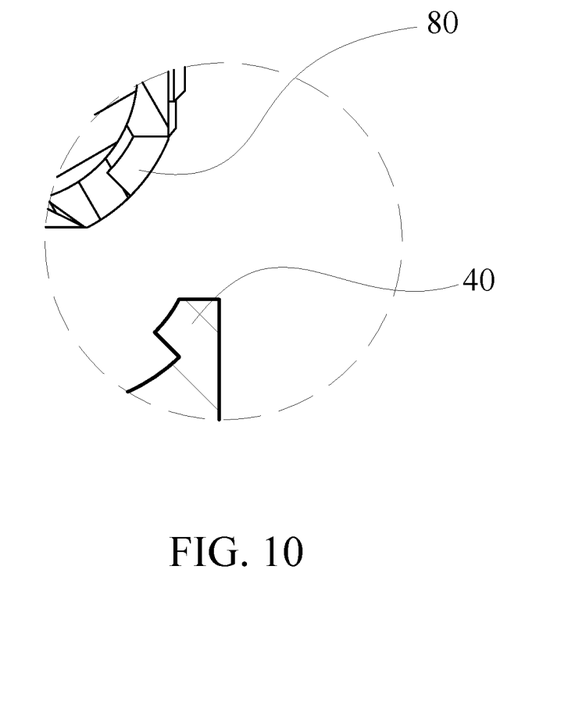
FIG. 10 is the enlarged view from FIG. 7B of aspects of a rail and an end.

A button biasing component 24 may contact the internal push button 22 and urge the push button 20, into a first position 64 (see FIG. 2A). The first position 64 may be the default, unactivated position of the push button 20. The push button 20 in the first position 64 may force or allow the arms 50 and ends 40 into a locked position 60. The push button 20 may be adjusted into a second position 66 (see FIG. 2B). Pressing or other manipulation of predetermined force may be necessary to activate or adjust the push button 20 from the first position 64 to the second position 66. Movement of the push button 20 from the first position 64 to the second position 66 may displace the arms 50 and ends 40 into an adjustment position 62 (see FIG. 4C-4D).

In alternative embodiments, the first position 64 may force or allow the arms 50 and ends 40 into the adjustment position 62. In such embodiments, movement of the push button from the first position 64 to the second position 66 may displace the arms 50 from an adjustment position into a locked position 60.

Buttresses 54 may extend from the inner surface of the gripping surface 16 or bumper 14. Four arm biasing components 52 may be disposed between an arm 50 surface and the buttresses 54. The arm biasing components 52 may comprise torsion springs. The arm biasing components 52 may urge the arms 50 inward towards the internal push button 22, into the locked position 60. In the locked position 60, the ends 40 may be relatively contracted, abutting the bumper 14 and gripping surface 16.

The arm biasing components 52 may be disposed between a relative inside surface of the buttress 54 and a relative outside surface of the arm 50, as in the embodiment depicted in FIGS. 4A-4D, thereby biasing the arms 50 inward, towards the locked position 60. In alternative embodiments, arm biasing components 52 may be disposed between a relative inside surface of the arms 50 and a relative outside surface of the buttress 54, thereby biasing the arms 50 outward, towards the adjustment position 62.

An adjustment position 62 may be achieved by activating the push button 20 out of the first position 60. The push button 20 may be activated by pressing it downward towards the grip 10 (see FIGS. 2A-B). The activated push button 20 forces the internal push button 22 into the arms 50. The contacting surfaces of the internal push button 22 and the arms 50 may have corresponding chamfer configurations, whereby downward movement of the internal push button 22 forces the arms 50 to be displaced perpendicularly to the movement of the internal push button 22. In turn, the ends 40 extend laterally outward. There may be space between the ends 40 and gripping surface 16 in the adjustment position 62 (see FIG. 2B). Grip width 94 may be greater in the adjustment position 62 than the locked position 60.

When the push button 20 is activated out of the first position 64, the button biasing component 24 may be compressed between the internal push button 22 and the inner surface—i.e. the surface facing the bumper and other components of the auxiliary grip 10—of the gripping surface 16. As the arms 50 move outward the arm biasing components 52 may be compressed between the arm 50 and the stationary buttress 54. The biasing components 22, 52 may simultaneously urge an activated push button 20 to return to the first position 64 and locked position 60. The locked position 60 may comprise a 0.5 mm to 2 mm grip width 94 tolerance range. The tolerance range may allow the arms 50 to couple with a case 12 in at a greater grip width 94 than the grip width 94 of the locked position 60 when the auxiliary grip is detached from a case 12. The first position 64 may have a tolerancing corresponding to the tolerance range of the locked position 60. The adjustment position 62 may be the arms 50 expanded to any grip width 94 greater than the tolerance range.

The bumper 14 and gripping surface 16 may be integrated into one, continuous housing not requiring conjunction of the two components (14, 16). The housing may contact and align the arms so they can move between the locked 60 position and adjustment 62 position. The gripping surface 16 may be rounded or otherwise shaped to contour a human hand. The bumper 14 may be relatively flat, enabling it to abut or lie substantially flush with the case 12 when the auxiliary grip 10 is coupled.

A switch 30 mechanism may integrate with the push button 20. A switch screw 34 may couple with the switch 30. A switch spring 32 may couple with the switch screw 34. The switch spring 32 may bias the switch 30 into a secured position 37. The secured position 37 may coincide with the first position 64. In the secured position 37, the switch spring 32 or switch screw 34 may be disposed between the switch 30 and a switch stop 36. In the secured position 37 it may not be possible to activate the push button 20 because the switch stop 36 may prevent the switch spring 32, or other switch 30 component, from moving downward, out of the first position 64. The switch stop 36 may extend from the gripping surface 16 or bumper 14, or may be an aspect of an arm 50. The stop 36 may remain stationary relative to the switch 30 and push button 20. The switch 30 may be capable of sliding away from the stop 36 (to the viewer's left when viewing FIGS. 4A-4B) into an unsecured position 38. In the unsecured position 38, the push button 20 may be activated out of the first position 64 (see FIGS. 4A-4D). When the push button 20 is pushed out of the first position 64, the switch spring 32, switch screw 34, switch 30, or some combination thereof may contact the side of the stop 36 and thereby maintain the unsecured position 38. The button biasing component 24 and arm biasing components 52 may simultaneously bias the push button 20 back into the first position 64 and the switch 30 out of the unsecured position 38. The switch spring 32 may urge the switch 30 into the secured position 37 when the push button 20 is returned to the first position 64.

The secured switch 30 may augment the coupling force of the auxiliary grip 10 in the first position 64. The secured switch 30 may prevent the auxiliary grip 10 from becoming detached from the case 12 due to inadvertent activation of the push button 20 out of the first position 64-locked position 60 embodiment. In embodiments where the second position 64 corresponds to the locked position 60, the secured 37 switch 30 may lock the push button 20 in the second position 64, thereby overcoming the biasing force of the button biasing component 24.

The switch 30 may be capable of coupling the push button 20 in the second position 66. A stop 36 may be configured to engage and secure the switch 36 in the second position 66, whereby the biasing force of arm biasing components 52 may be overcome, enabling preservation of the second position 66 without manual force being applied to the push button 20. This enables the user to maintain the position—locked position 60 or adjustment position 62—corresponding to the first position 64 or second position 66, in the respective embodiment.

Ancillary coupling means 70 may permit coupling of auxiliary devices with the auxiliary grip 10. The ancillary coupling means 70 may comprise an aspect of the arms 50 or gripping surface 16. The ancillary coupling means 70 may comprise threaded sockets capable of threadably coupling an auxiliary device. Ancillary coupling means 70 may be configured to couple audio microphones, display screens, or other devices.

The push button 20 and arms 50 may be comprised of aluminum or other sufficiently durable material. The ends 40 may be comprised of thermoplastic elastomer or other material capable of coupling with a case 12 without damage. The bumper 14 and grip 16 components may be comprised of thermoplastic elastomer or other material with appropriate tactile and durability qualifications.

A case 12 configured to couple with a mobile device 100 may define a rail width 84 and case length 86. Two rails 80 may comprise aspects of a perimeter of the case 12. The rails 80 may define an adjustment range 88. The adjustment range 88 may be parallel to the case length 86. An aperture 82 aspect of the case 12 may allow exposure of a portion of the coupled mobile device 100.

The rails 80 may partially penetrate the perimeter of the outer surface of the case 12, forming parallel grooves. The rail width 84 may correspond to the grip width 94 of the arms 50 in the locked position 60. The ends 40 and alterable grip width 94 may be configured with surfaces capable of simultaneously engaging and coupling with the rails 80 when in the locked position 60. The push button 20 and switch 30 remain exposed to manual manipulation while the auxiliary grip 10 is coupled with the case 12, enabling alteration between the locked 60 to the adjustment position 62. The the auxiliary grip 10 in an adjustment position 62 may be able to completely disengage from the case 12 in some embodiments.

In some embodiments, the grip width 94 may be configured so the auxiliary grip 10 remains coupled with the case 12 but capable of movement within the adjustment range 88 when activated out of a locked position 60. To couple the auxiliary grip 10 with the case 12 in embodiments in which the first position 60 corresponds with the locked position 64, the push button 20 is activated into the adjustment position 62 and the auxiliary grip 10 is oriented within the adjustment range 88. When the desired auxiliary grip 10 orientation is achieved, the push button 20 is released, whereby the ends 40 retract to a locked position 60 and the auxiliary grip 10 stably couples with the case 12. Each end 40 may be configured to insert into a rail 80. The lock position 60 grip width 94 may be at the outer bound of the grip width 94 tolerance range when coupled with the case 12. The switch 30 altered into the secured position 37 to prevent inadvertent detachment of the auxiliary grip 10 from the case 12.

To couple the auxiliary grip 10 with the case 12 in embodiments in which the first position 60 corresponds with the adjustment position 64, the auxiliary grip 10 is oriented within the adjustment range 88. When the desired auxiliary grip 10 orientation is achieved, the push button 20 is activated into the second position 66, whereby the ends 40 retract to a locked position 60 and the auxiliary grip 10 couples with the case 12. The switch may be altered into the secured position 37, whereby the second position 66 and locked position 60 may be maintained against the biasing forces of the button biasing component 24 and the arm biasing components 52.Steps 81 may define slots 83 within each rail 80. The outer surface of the steps 81 may be flush with the adjacent surface of the case 12. The slots 83 may partially penetrate the case 12. Steps 81 in opposing rails 80 may align relative to the case length 86, allowing rectilinear adjustment of the auxiliary grip 10 within the adjustment range 88. The slots 83 may define predetermined grip orientations, allowing a user to quickly identify and couple the auxiliary grip 10 at the desired orientation. The steps 81 may prevent the auxiliary grip 10 from moving out of the predetermined orientation when the auxiliary grip 10 is in the locked position 60 and coupled with the case 12. The auxiliary grip 10 grip width 94 may be perpendicular to the adjustment range 88 when the auxiliary grip 10 and case 12 are coupled.

A combination of polycarbonate and thermoplastic materials may comprise the case 12.

The foregoing discussion discloses and describes merely exemplary embodiments. As will be understood by those familiar with the art, the disclosed subject matter may be embodied in other specific forms without departing from the essence or characteristics thereof. Accordingly, the foregoing disclosure is intended to be illustrative, but not limiting, of the scope of the invention, which is set forth in the following claims.

The invention claimed is:

1. An auxiliary grip system, comprising:
   a. a push button and two arms;
   b. the push button capable of a first and a second position;
   c. the two arms comprising a locked position when the push button is in the first position;
   d. each of the two arms comprising an end;
   e. the ends defining an alterable grip width;
   f. the push button contacting the two arms in the second position, whereby the arms are displaced into an adjustment position;
   g. the adjustment position comprising a grip width greater than the locked position's grip width;
   h. a case, the case being configured to couple a mobile device;
   i. the auxiliary grip being capable of coupling with the case when the push button is in the first position;

j. a button biasing component biases the push button into the first position;
k. the case comprising two rails, the two rails comprising an adjustment range;
l. a plurality of arm biasing components bias the two arms into the locked position;
m. a switch capable of securing the push button in the first position.

2. An auxiliary grip system, comprising:
a. a push button and two arms;
b. the push button capable of a first and a second position;
c. the two arms comprising a locked position when the push button is in the first position;
d. each of the two arms comprising an end;
e. the ends defining an alterable grip width;
f. the push button contacting the two arms in the second position, whereby the arms are displaced into an adjustment position;
g. the adjustment position comprising a grip width greater than the locked position's grip width;
h. a case, the case being configured to couple a mobile device;
i. the auxiliary grip being capable of coupling with the case when the push button is in the first position;
j. a button biasing component biases the push button into the first position;
a. the case comprising two rails, the two rails comprising an adjustment range;
b. a plurality of arm biasing components bias the two arms into the locked position;
k. a switch capable of securing the push button in the second position.

3. An auxiliary grip system, comprising:
a. a push button and two arms;
b. the push button capable of a first and a second position;
c. the two arms comprising an adjustment position when the push button is in the first position;
d. each of the two arms comprising an end;
e. the ends defining an alterable grip width;
f. the push button contacting the two arms in the second position, whereby the arms are displaced into a locked position;
g. the adjustment position comprising a grip width greater than the locked position's grip width;
h. a case, the case comprising a planar back surface and two sides;
i. the auxiliary grip being capable of coupling with the case when the push button is in the second position.

4. The auxiliary grip system in claim 3, wherein a button biasing component biases the push button into the first position.

5. The auxiliary grip system in claim 3, wherein a plurality of arm biasing components bias the two arms into the adjustment position.

6. The auxiliary grip system in claim 3, comprising a switch capable of securing the push button in the first position.

7. The auxiliary grip system in claim 3, comprising a switch capable of securing the push button in the second position.

8. The auxiliary grip in claim 3, wherein an ancillary grip comprises at least one ancillary coupling means.

9. The auxiliary grip system in claim 3, wherein the case comprises two rails, the two rails comprising an adjustment range.

10. The auxiliary grip system in claim 9, wherein the auxiliary grip may operatively couple with the rails and move within the adjustment range while in the first position.

11. The auxiliary grip system in claim 9, wherein the two rails comprise a plurality of steps, the plurality of steps defining predetermined grip orientations.

12. The auxiliary grip system in claim 9, wherein the auxiliary grip comprises a housing, the housing housing at least a portion of the two arms and the push button.

* * * * *